United States Patent
Davies

(10) Patent No.: US 11,689,933 B2
(45) Date of Patent: Jun. 27, 2023

(54) FACE MASK COMMUNICATION SYSTEM WITH AN EMBEDDABLE MICROPHONE

(71) Applicant: MICROSOFT TECHNOLOGY LICENSING, LLC, Redmond, WA (US)

(72) Inventor: Joseph Glenn Davies, Leavenworth, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 145 days.

(21) Appl. No.: 17/240,229

(22) Filed: Apr. 26, 2021

(65) Prior Publication Data

US 2022/0345893 A1 Oct. 27, 2022

(51) Int. Cl.
*H04W 12/33* (2021.01)
*H04W 76/14* (2018.01)
*H04M 1/02* (2006.01)

(52) U.S. Cl.
CPC ......... *H04W 12/33* (2021.01); *H04M 1/0262* (2013.01); *H04W 76/14* (2018.02); *H04M 2250/02* (2013.01)

(58) Field of Classification Search
CPC ... H04W 12/33; H04W 76/14; H04M 1/0262; H04M 1/6066; H04M 2250/02; A62B 18/08; A62B 23/025; H04R 1/083; H04R 2420/07

See application file for complete search history.

(56) References Cited

U.S. PATENT DOCUMENTS

| | | | | | |
|---|---|---|---|---|---|
| 4,384,577 A | * | 5/1983 | Huber | ................ | A41D 13/1146 128/206.19 |
| 4,537,276 A | * | 8/1985 | Confer | ................... | G10K 11/22 181/22 |
| 7,221,966 B2 | * | 5/2007 | Birli | ....................... | H04B 1/385 455/575.2 |

(Continued)

FOREIGN PATENT DOCUMENTS

| CN | 203646543 U | 6/2014 |
|---|---|---|
| CN | 206620890 U | 11/2017 |

(Continued)

OTHER PUBLICATIONS

Maskfone, Retrieved from:https://web_archive.org/web/20210121011256/https://maskfone.com/,Jan. 21, 2021, 12 pages. (Year: 2021).*

(Continued)

*Primary Examiner* — Farid Seyedvosoghi
(74) *Attorney, Agent, or Firm* — NovoTechIP International PLLC

(57) ABSTRACT

A system and method for a face mask communication system. The face mask communication system includes a removable microphone that can be installed in a face mask to allow the wearer to clearly and privately communicate with another user over a Bluetooth enabled mobile device such as a cell phone. In illustrated examples, a microphone unit is deformable to enable the microphone unit to form a custom fit over the nose bridge to seal the mask on the user's face. The face mask communication system includes an application program operating on the mobile device that allows a user to initiate and secure private conversations with other users.

12 Claims, 11 Drawing Sheets

(56) References Cited

U.S. PATENT DOCUMENTS

| | | | |
|---|---|---|---|
| 7,342,502 B2 | 3/2008 | Harkins et al. | |
| 7,783,034 B2 * | 8/2010 | Manne | H04M 1/05 379/447 |
| 2002/0166557 A1 | 11/2002 | Cooper | |
| 2003/0058100 A1 * | 3/2003 | Jumpertz | A42B 3/0433 704/E15.045 |
| 2005/0201548 A1 * | 9/2005 | Birli | H04M 1/05 379/388.05 |
| 2005/0250552 A1 * | 11/2005 | Eagle | H04M 1/72412 455/567 |
| 2017/0332710 A1 * | 11/2017 | Bot | A41D 31/102 |
| 2020/0315266 A1 | 10/2020 | Mcmahon | |

FOREIGN PATENT DOCUMENTS

| | | |
|---|---|---|
| CN | 108513224 A | 9/2018 |
| KR | 200290420 Y1 | 9/2002 |
| KR | 100625414 B1 | 9/2006 |
| KR | 20120048432 A | 5/2012 |
| KR | 102218636 B1 | 2/2021 |
| WO | 2004100690 A2 | 11/2004 |
| WO | WO-2017070499 A1 * 4/2017 ............ A62B 18/08 |
| WO | WO-2021204947 A1 * 10/2021 | |
| WO | WO-2022139676 A1 * 6/2022 | |

OTHER PUBLICATIONS

Wolfe, et al., "Optimizing Communication in Schools and Other Settings During COVID-19", In The Hearing Journal, vol. 73, No. 9, Sep. 1, 2020, 5 Pages.

"Application as filed in Indian Patent Application No. IN202011048322", Filed Date: Nov. 5, 2020, 11 Pages.

"Maskfone", Retrieved from: htttps://web.archive.org/web/20210121011256/https://maskfone.com/, Jan. 21, 2021, 12 pages.

"International Search Report and Written Opinion Issued in PCT Application No. PCT/US22/023207", dated Jun. 30, 2022, 12 Pages.

Servantes, Ian, "This smart face mask pairs with your phone and has built-in earbuds", Retrieved from: https://www.inputmag.com/style/maskfone-smart-face-mask-built-in-wireless-earbuds, Sep. 24, 2020, 3 Pages.

* cited by examiner

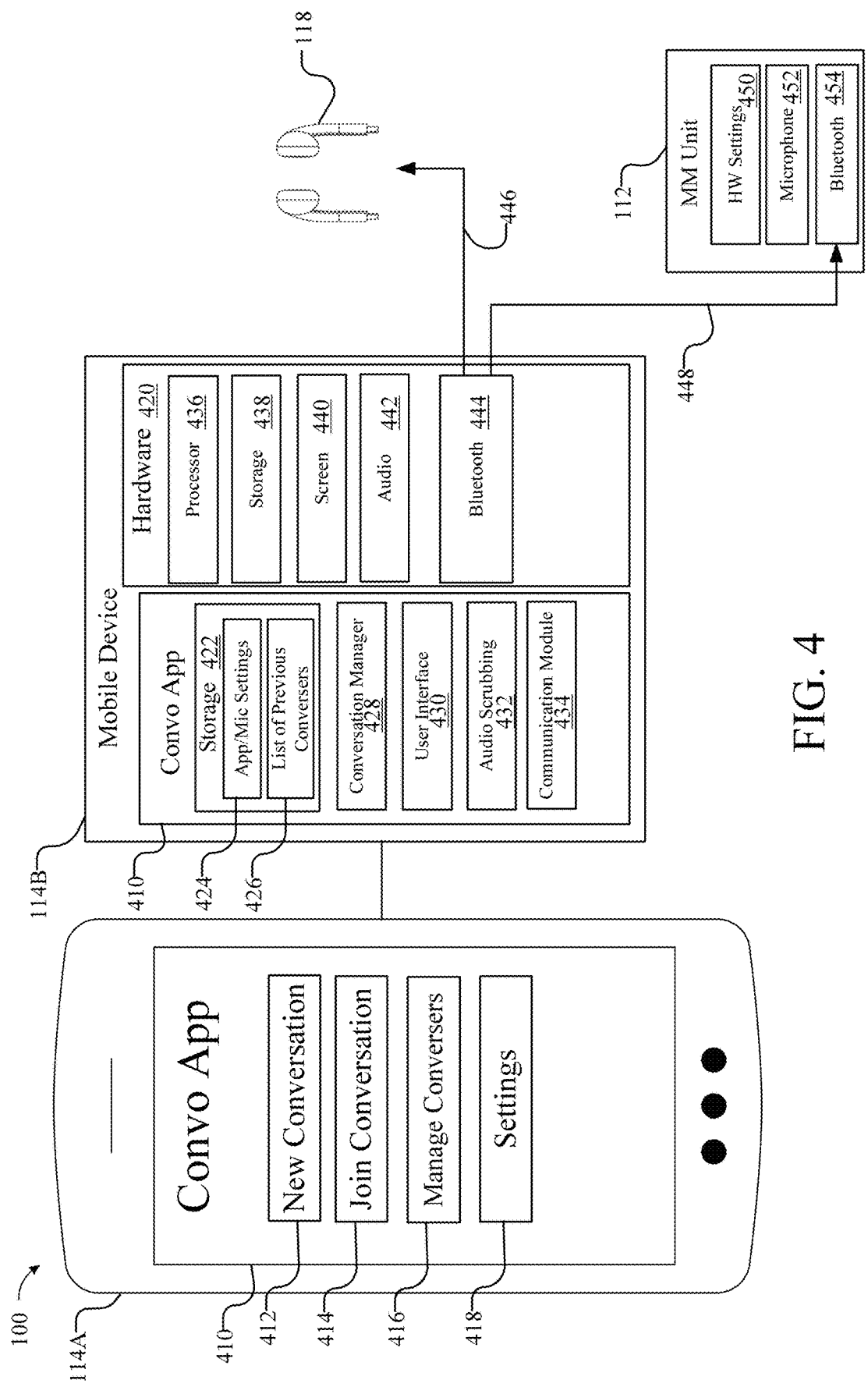

FACE MASK COMMUNICATION SYSTEM WITH AN EMBEDDABLE MICROPHONE

TECHNICAL FIELD

The disclosure relates generally to face masks and communication with mobile devices and, more particularly, to a system and method for communicating with an embeddable microphone in a face mask to provide clear communication between users.

BACKGROUND

Due to the coronavirus pandemic, wearing face masks has become nearly universal. Face masks worn to prevent the spread of COVID-19, or worn for other reasons, tend to muffle voices and make communication between people in voice proximity of each other difficult. Face mask wearers must often speak louder than normal to ensure they are heard even by someone close by. Further, crowded places, places with background noise or other noisy environments cause additional difficulty having private conversations while wearing a face mask.

SUMMARY

A system and method for a face mask communication system is described. The face mask communication system includes a removable microphone unit that can be installed in a face mask to allow the wearer to clearly and privately communicate with another user over a Bluetooth-enabled mobile device such as a cell phone. In illustrated examples, a microphone unit is deformable to enable the microphone unit to form a custom fit over the nose bridge and seal the mask on the user's face. The face mask communication system includes an application program operating on the mobile device that allows a user to initiate and secure private conversations with other users.

A mask microphone unit is disclosed which includes: a microphone; a deformable housing allowing the mask microphone unit to form a custom fit over the bridge on a user's nose when installed in a mask; a receiver/transmitter in the housing with a Bluetooth interface connected to the microphone; a battery receptacle in the housing for a battery providing power to the receiver; and a connector module attached to the housing providing a connection for charging the battery.

In another implementation, a method of communicating with a mobile device while wearing a mask is described which includes providing a conversation application for execution on a first mobile device; connecting the conversation application to a mask microphone unit embedded in a mask wearable by a first user to allow the first user to connect with a mobile device of a second user; initiating and securing a conversation with the second user; and configuring microphone unit settings.

In another implementation, a face mask communication system is disclosed which includes a mask microphone unit removably insertable into a face mask, the mask microphone unit comprising: a microphone; a deformable housing allowing the mask microphone unit to form a custom fit over the bridge of a user's nose; a receiver/transmitter in the housing with a communication interface connected to the microphone; a battery receptacle within the housing for a battery providing power to the receiver; and a conversation application comprising executable instructions that, when executed by a processor, cause the processor to control a mobile device to: connect the conversation application to the mask microphone unit embedded in a mask wearable by a first user to allow the first user to converse with a second user; initiate and secure a conversation with the second user; and configure microphone unit settings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 4 illustrates an example functional block diagram of a face mask communication system in accord with teachings herein.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

This description is directed to a system and method for a face mask communication system to overcome the technical problem of communicating while wearing a face mask. The face mask communication system provides a technical solution to this problem by providing a removable microphone unit that can be installed in a face mask to allow the wearer to clearly and privately communicate with other users over a Bluetooth enabled mobile device such as a cell phone. In some implementations, a microphone unit is deformable to enable the microphone unit to form a custom fit over the nose bridge to seal the mask on the user's face. The face mask communication system includes an application program operating on the mobile device that allows a user to initiate and secure private conversations with other users as described herein. In some implementations, the face mask communication system advantageously provides a conversation application that connects to a microphone embedded in a mask wearable by an initiator user, also referred to as a first user, to connect with a mobile device of a joiner user, also referred to as a second user, initiate and secure a conversation with a joiner user, where the joiner user is a new converser or a previous converser, and allow the user to configure microphone unit settings as described herein.

Figure 1:
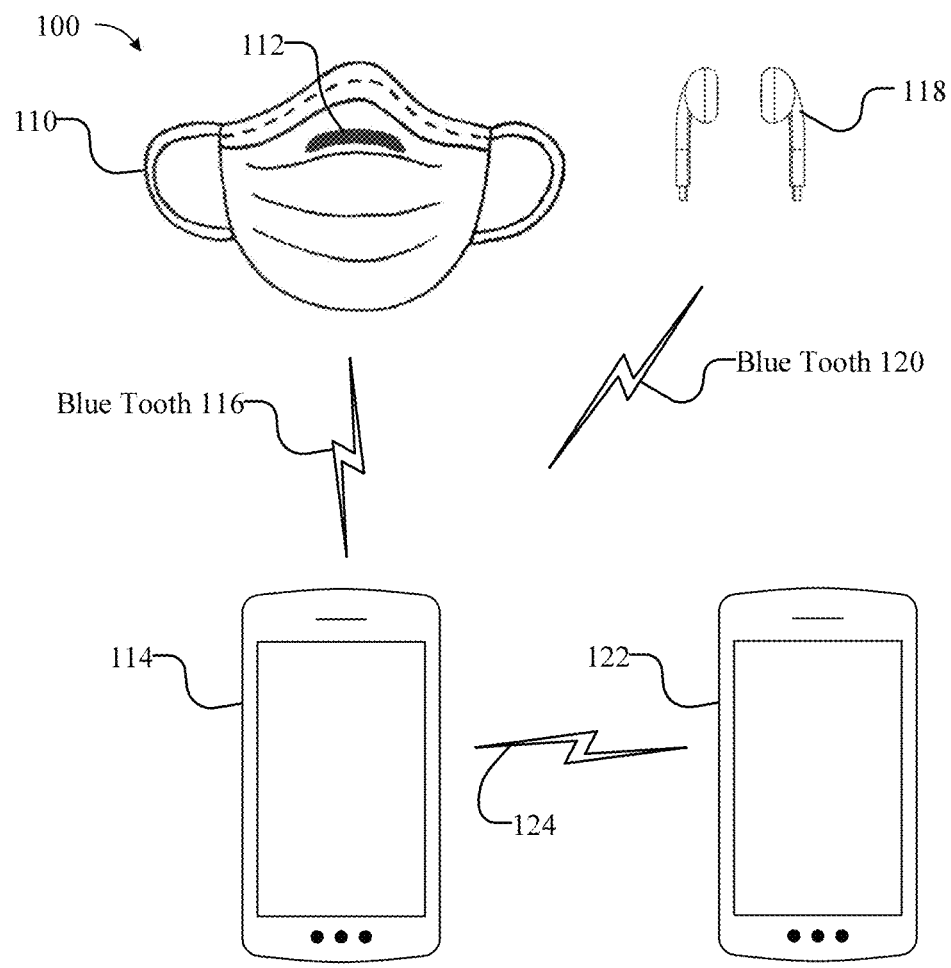
FIG. 1 illustrates an exemplary face mask communication system in accord with the teachings herein.

FIG. 1 illustrates an exemplary face mask communication system 100. The face mask communication system 100 includes a face mask 110 with a mask microphone unit 112 installed or otherwise connected to the mask 110. The face mask 110 may be any suitable type of face mask, including medical grade, cloth, dust or other types of masks covering the mouth and nose of a user. The mask 110 is preferably adapted or fitted to support a mask microphone unit 112. The mask microphone unit 112 communicates with a mobile device 114 over a Bluetooth communication path 116. The mobile device may be a cell phone or another suitable Bluetooth enabled device. The face mask communication system 100 communicates with one or more earphones 118 to allow the user of the system to hear a conversation with another user as described herein. The face mask communication system 100 thus provides the technical advantage of being able to provide clear and secure verbal communication between users. The earphones 118 may also be used to provide feedback of a user's own voice through their earphones. In the example shown in FIG. 1, the earphones 118 communicate with the mobile device 114 over a Bluetooth communication path 120. Alternatively, the earphones could use a wire connection to the mobile device. The earphones 118 may be any type of earphones suitable for communication with the mobile device as known or developed in the future.

Still referring to FIG. 1, the face mask communication system 100 allows a user to initiate and secure private conversations with others. In the illustrated example, a user (not shown) uses the mobile device 114 to communicate with another user of a second mobile device 122 over a Bluetooth communication link 124. The second mobile device 122 may be a similar mobile device as described for the first mobile device 114. The second mobile device 122 may be part of a second face mask communication system as described herein, however, for simplicity, these parts are not shown in FIG. 1.

Figure 2:
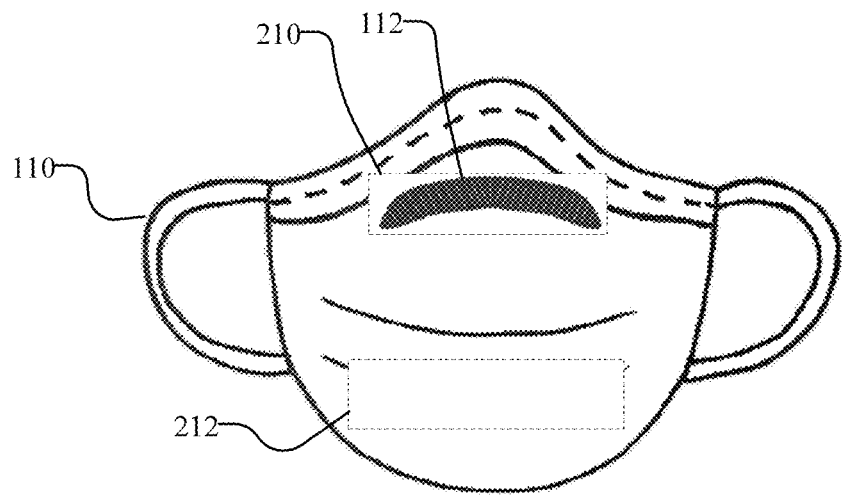
FIG. 2 illustrates an example of a face mask with a face mask microphone unit installed in the face mask.

FIG. 2 illustrates an example of a face mask 100 with a mask microphone unit 112 as described herein. In this example, the mask microphone unit 112 is installed in a slot or sleeve 210 of the face mask within an upper area of the mask that will be over the nose when worn by the user. This allows a flexible mask microphone unit 112 to form a custom fit over a user's nose bridge for the mask 100. The flexible mask microphone unit 112 in this location can be form-fitted to the user's nose bridge shape to provide a tight fit on the user's face. The tight fit on the user's face provides additional technical advantages of enhanced mask function, and preventing or reducing fogging of glasses that may be worn by some users. Placing the mask microphone unit 112 in a sleeve allows the mask microphone unit to be interchanged with a fresh mask. Alternatively, the mask microphone unit 112 may be placed in a second mask to be worn over or under the primary face mask 110. In another example, the mask microphone unit 112 may be placed in a slot or sleeve in another location such as shown at 212. When mounted in other locations, the mask microphone unit may be unable to perform the flexible bridge function as described above but provides the other benefits and functions described herein. Other methods of attaching the mask microphone unit 112 to the mask 110 could also be used which allow the mask microphone unit to be removeable.

Figure 3A:
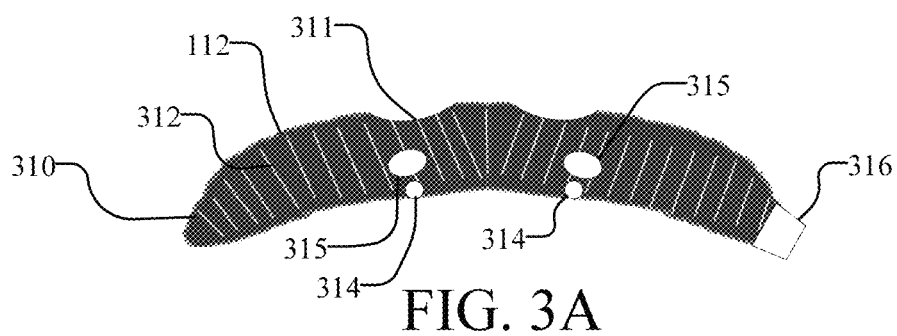
FIG. 3A illustrates features of a mask microphone unit as taught herein.
Figure 3B:
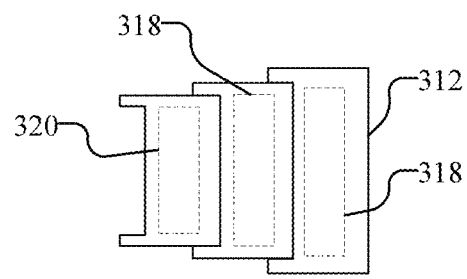
FIG. 3B illustrates segments of a mask microphone unit that allow the mask microphone unit to form a custom fit over a user's nose bridge.
Figure 3C:
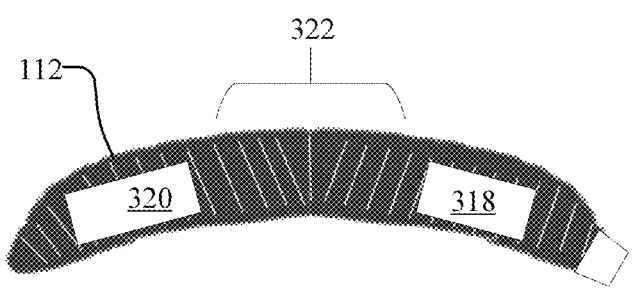
FIG. 3C illustrates another example of the face mask microphone unit.

FIGS. 3A through 3C illustrate additional features and alternatives of the mask microphone unit 112. The mask microphone unit 112 in the example shown in FIG. 3A includes a housing 310 with indentations 311 for a user's eyeglasses, segments 312, microphone ports 314, microphones 315 and a connection port 316. The indentations 311 may help to hold the mask microphone unit 112 in position relative to the eyeglasses (not shown). The microphone ports 314 are positioned over embedded microphones 314. The mask microphone unit 112 preferably includes a connection port 316. In the example shown in FIG. 3A, the connection port 316 is at one end of the mask microphone unit 112. The connection port allows a connection of the battery (not shown) to a charger such as a USB charger (not shown) or other types of charging cable connectors for mobile devices as known or developed in the future. The connection port 316 may include a changeable adapter to allow the connection port to be used with various connectors and contains the electronics to interface between the various connection cables and the mask microphone unit charging system. The primary function of the adapter port is for charging the mask microphone unit 112. Alternatively, the connection port 316 may incorporate a non-contact charging port.

The housing of the mask microphone unit 112 is preferably flexible to allow the mask microphone unit 112 to be formed to the user's nose bridge as described above. In the illustrated examples, the housing is formed of segments 312 as represented by the lines on the housing. FIG. 3B illustrates an enlarged view of the housing segments 312. Each segment moveably engages adjacent segments to allow the mask microphone unit 112 to adjust in shape. Internal components of the mask microphone unit 112 may reside in the segments 312. For example, the internal components 318 may be discrete portions of a battery residing in multiple segments 314 that are wired or otherwise connected together to provide a battery for the mask microphone unit 112. The housing of the mask microphone unit may also be a housing made of pliable material that allows manipulation to fit over a user's nose bridge and keeps its shape.

FIG. 3C illustrates another example of a face mask microphone unit. In this example, the mask microphone unit 112 includes a battery receptacle 318 and a receiver/transmitter 320. In this example, the battery is a single component located in the battery receptacle 318 located in the housing of the mask microphone unit 112. Similarly, in this example, the receiver/transmitter 320 is a single component. The receiver/transmitter 320 contains the electronics for short range communication, such as a Bluetooth receiver/transmitter, that provides a communication interface to communicate with the mobile device as described herein. Alternatively, the receiver/transmitter could be located in multiple segments 312. Further, in this example, a center section 322 of the mask microphone unit 112 is a deformable material with plastic properties that allows the mask microphone unit 112 to be formed to the shape of the user's nose. In this example, the housing of the mask microphone unit 112 may or may not be formed of segments as described above.

FIG. 4 illustrates an example block diagram of a face mask communication system 100. The block diagram includes a physical representation 114A of a mobile device as seen by a user (not shown). In addition, the block diagram includes a functional block 114B of the same mobile device. The physical representation 114A and the functional block 114B are collectively referred to as mobile device 114. The mobile device 114 is a mobile computer device capable of executing a software application of the mask communication system. In the illustrated example, the software application is a conversation application, referred to in the drawings as "Convo App" 410. The conversation application 410 may display to the user various options that allow the user to set up and use the mask communication system 100. In the example shown in FIG. 4, the conversation application 410 has options for new conversation 412, join conversation 414, manage conversers 416 and settings 418. Each of these options is described in more detail below.

Still referring to FIG. 4, the functional block 114B of the mobile device 114 includes a block diagram of the conversation application 410 and hardware blocks 420. The conversation application 410 includes storage 422 with application and microphone settings 424, and a list of previous conversers 426. The conversation application 410 further may include a conversation manager 428, a user interface 430, audio scrubbing block 432, and a communication module 434. The hardware blocks 420 include a processor 436, storage 438, screen 440, audio 442 and Bluetooth 444. The Bluetooth hardware block 444 has a first Bluetooth connection 446 that connects to the earphones 118, and a second Bluetooth connection 448 that connects to the mask microphone unit 112. The mask microphone unit 112 includes hardware settings 450, a microphone 452 and a Bluetooth communication block 454. These components of the mask microphone unit 112 comprise the receiver/transmitter 318 shown in FIG. 3C.

Figure 5:
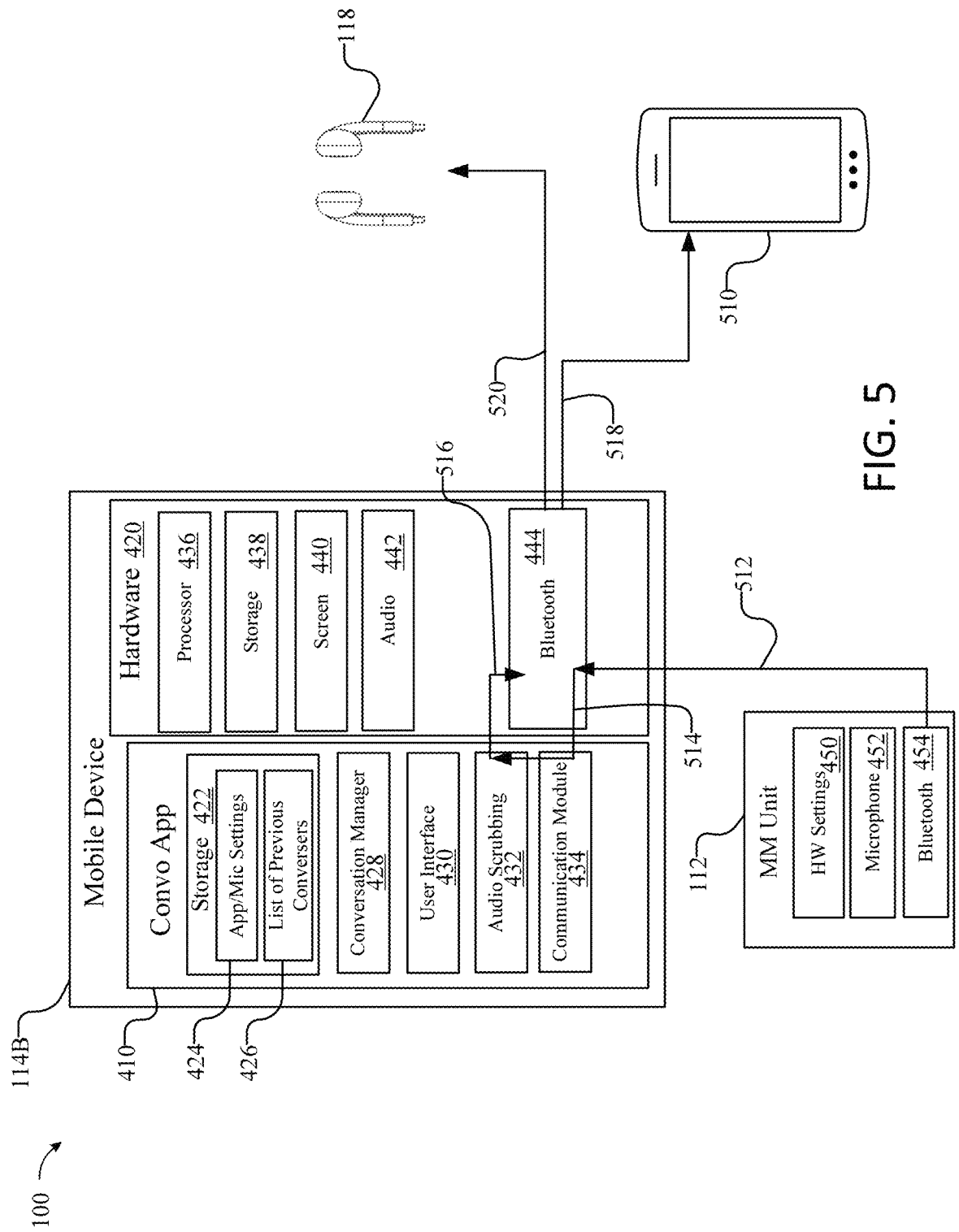
FIG. 5 illustrates an example of communication flow for a face mask communication system.

FIG. 5 illustrates an example of communication flow for a face mask communication system 100. In this example, it is assumed that a first user is wearing a mask with the mask microphone unit 112 connected to a first mobile device 114B. The first user communicates with a second user that is wearing a mask with the mask microphone unit and using a second mobile device 510. The first user's speech is picked up by the microphone 452 and sent by the mask microphone unit 112 over a Bluetooth link 512 to the mobile device 114B. The Bluetooth module 444 on the mobile device 114B receives the first user's speech over the Bluetooth link 510 and forwards 514 the speech signal to the communications module 434. The communications module routes digital audio from the mask microphone unit to other components of the conversation app and components of the mobile phone. The communications module may then send the speech signal to an audio scrubbing block 432. The audio scrubbing block 432 filters the speech signal to remove the effects of human speech when spoken inside a mask and background noise to enhance the speech signal. The speech signal is then routed 516 to the Bluetooth module 444 for broadcasting. The Bluetooth module 444 broadcasts the speech signal to the second user's mobile device 510 over a Bluetooth link 518. In addition, the Bluetooth module 444 may also send the enhanced speech signal to earphones 118 worn by the first user. Bluetooth transmissions to the earphones 118 may be over a second Bluetooth link 520. In a similar fashion, the second mobile device 510 may receive the speech signal of the first user and send it to a second set of earphones (not shown) worn by the second user.

Figure 6:
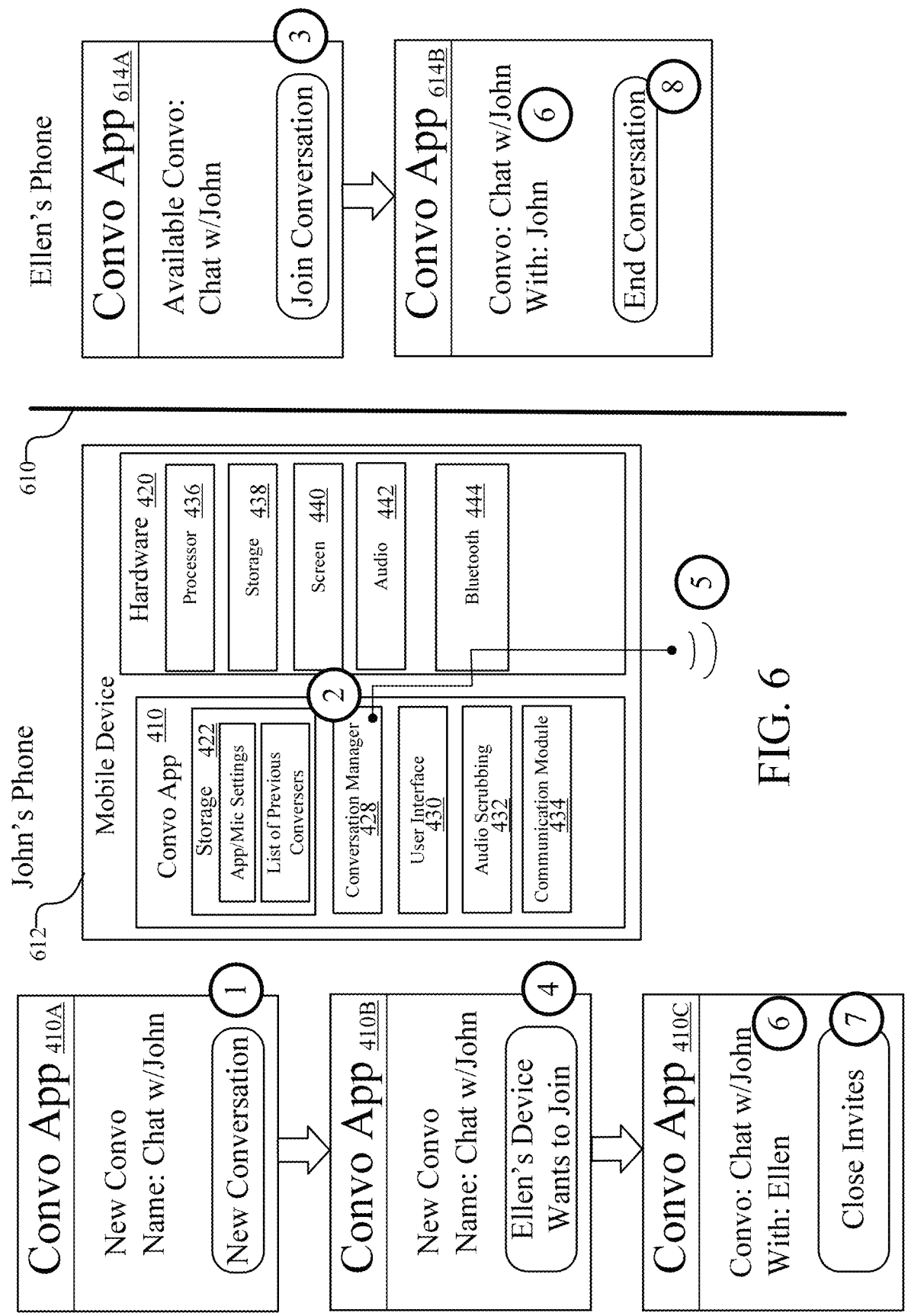
FIG. 6 illustrates an example of communication flow for a user initiating a conversation with a new converser for a face mask communication system as taught herein.

FIG. 6 illustrates an example of communication flow for a user initiating a conversation with a new converser for a face mask communication system 100 as described herein. In this example, blocks on the left of line 610 represent blocks and events taking place on a first user's mobile device, referenced herein as "John's Phone" 612. Similarly, blocks on the right of line 610 represent blocks and events taking place on a second user's mobile device, referenced herein as "Ellen's Phone" (Ellen's phone is not shown but views of a conversation application executing on Ellen's phone is shown in sequence in 614A, 614B.) In this example, John and John's phone are the conversation initiator and Ellen and Ellen's phone are the conversation joiner.

Still referring to FIG. 6, the communication flow for a user initiating a conversation with a new converser will be described as a sequence of steps where the steps are shown in FIG. 6 as numbered circles 1 through 8. First, the conversation initiator, John, starts a conversation on the conversation application with a conversation name (Step 1). This may be in response to John selecting a "New Conversation" button on the interface of the conversation application 410A. John's phone broadcasts via Bluetooth a new conversation with an open invitation (Step 2). The conversation application 614A on Ellen's phone sees the conversation invite from John's phone. Ellen sees the invitation and selects "Join Conversation" on her Conversation application 614A to join the conversation (Step 3). Ellen's selection is transmitted to John's phone, the conversation application 410B then displays that Ellen wants to join the conversation and John selects the button to add Ellen (Step 4). Optionally, the conversation initiator and conversation joiner's phones may negotiate the highest Bluetooth security for their connections and exchange authentication keys (Step 5). The Conversation applications 410C, 614B show phone names in the conversation (Step 6). For a two-person conversation, the conversation initiator (John) may close invites, which stops the Conversation application from broadcasting the named conversation (step 7). The conversation continues until one of the parties chooses to close the conversation. This may be accomplished by one of the parties choosing an "End Conversation" button (Step 8).

Figure 7:
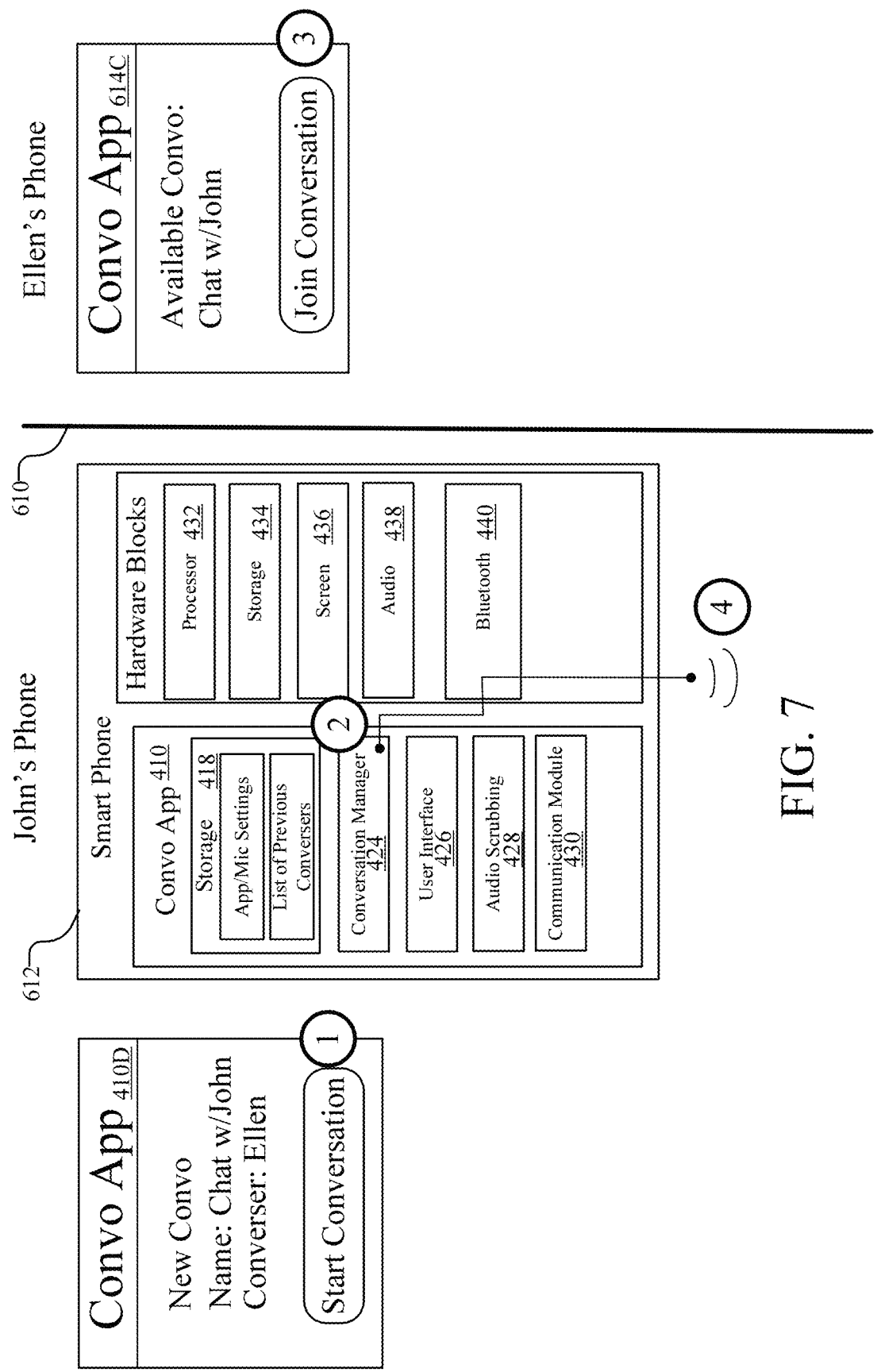
FIG. 7 illustrates an example of communication flow for a user initiating a conversation with a previous converser.

FIG. 7 illustrates an example of communication flow for a user initiating a conversation with a previous converser. Similar to what is shown in FIG. 6, blocks on the left of line 610 represent blocks and events taking place on John's phone 612 and blocks on the right of line 610 represent blocks and events taking place on Ellen's phone. In this example, John and John's phone are the conversation initiator and Ellen and Ellen's phone are the conversation joiner. Again, the communication flow for a user initiating a conversation with a new converser will be described as a sequence of steps where the steps are shown in FIG. 7 as numbered circles 1 through 4. First, the conversation initiator, John, starts a conversation on the conversation application with a conversation name and picks Ellen's name from a list of previous joiners (Step 1). The Conversation application 410D on John's phone broadcasts via Bluetooth a new conversation with a closed invitation to Ellen's phone (Step 2). The Conversation application 614C on Ellen's phone sees the conversation invite from John's phone and displays it. Ellen sees the invitation and selects "Join Conversation" on her Conversation application 614C to join the conversation (Step 3). The John's and Ellen's phones may use previously negotiated authentication keys to authenticate each other (Step 4). The conversation may then proceed until closed as described above with reference to FIG. 6.

Figure 8:
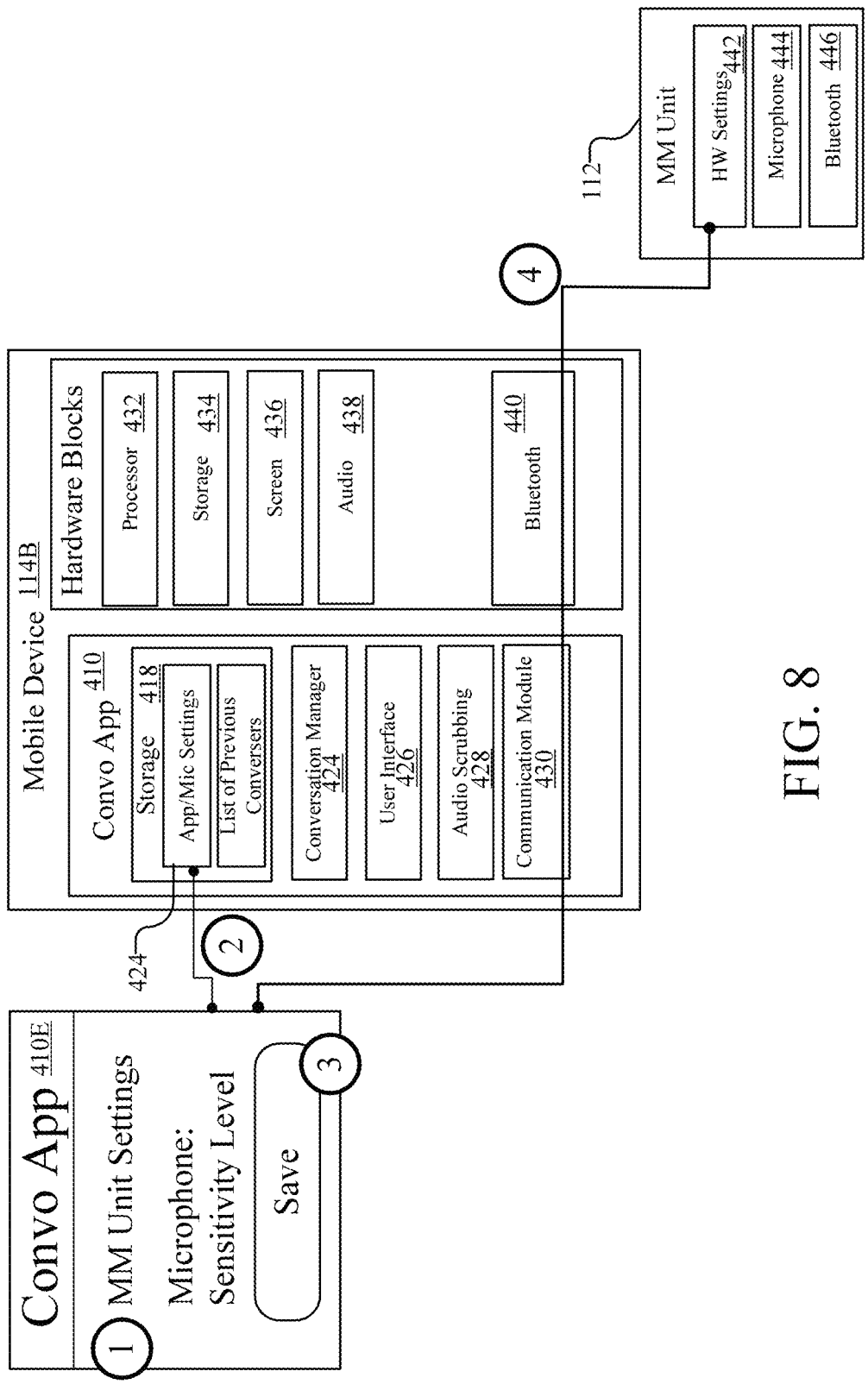
FIG. 8 illustrates an example of communication flow for a user setting hardware configuration settings.

FIG. 8 illustrates an example of communication flow for a user setting hardware configuration settings on a mask microphone unit 112. Again, the communication flow for a user initiating a conversation with a new converser will be described as a sequence of steps where the steps are shown in FIG. 8 as numbered circles 1 through 4. The user of the mobile device 114B brings up settings user interface in the Conversation application 410E (Step 1). The Conversation application 410E can also retrieve the current mask settings 424 from those in storage 418 (Step 2). The Conversation application allows the user to make changes to the settings and save them to storage (Step 3). In addition, the Conversation application uses a Bluetooth connection to send the updated settings to the mask microphone unit 112 (Step 4). The mask microphone unit 112 may store the updated settings in hardware setting 442. The hardware settings may include microphone sensitivity, required Bluetooth security levels, and power management settings.

Figure 9:
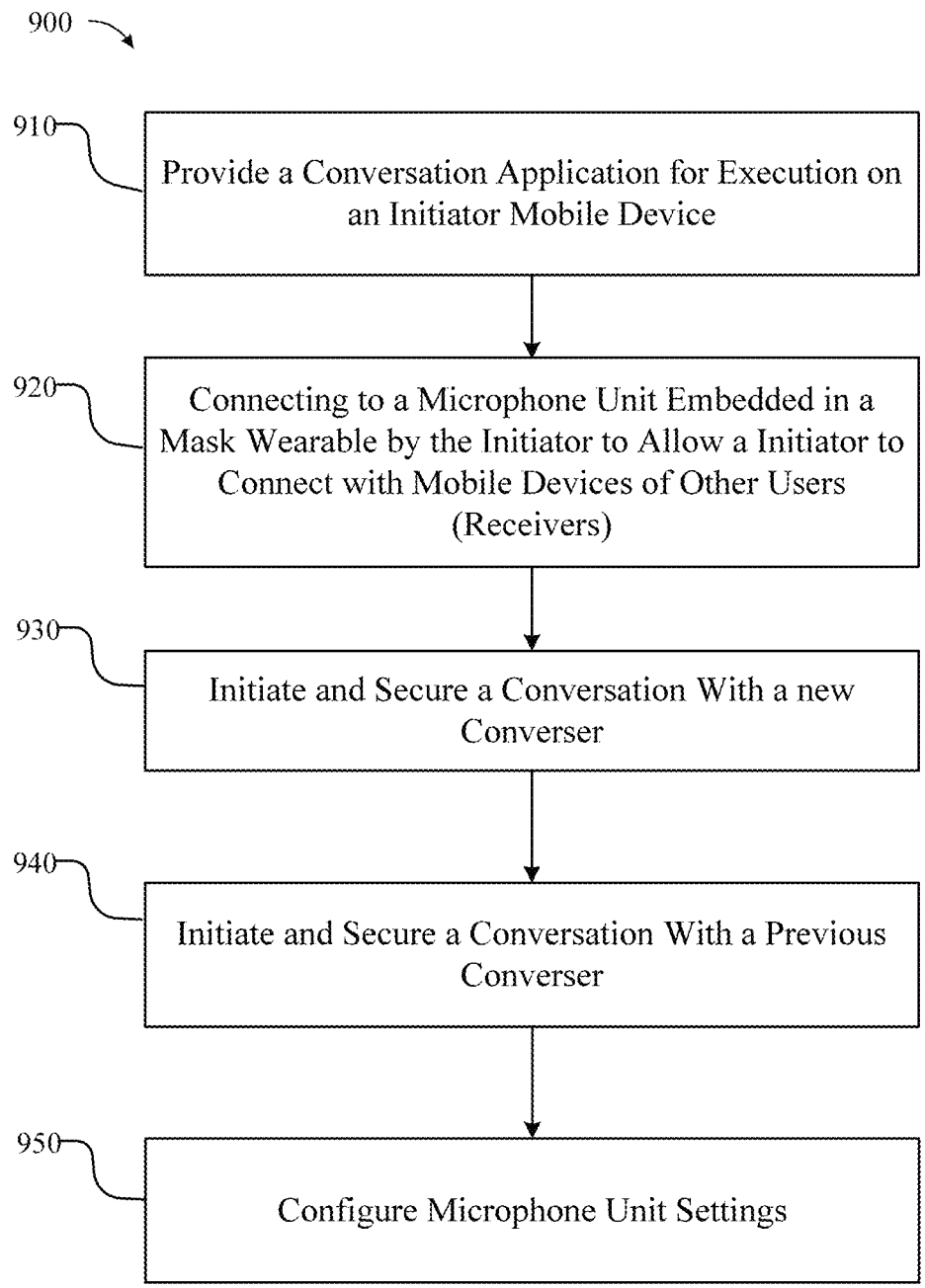
FIG. 9 is an example implementation of a method for a face mask communication system as taught herein.

FIG. 9 is an example implementation of a process 900 for a face mask communication system. The process 900 begins with providing a conversation application for installation on an initiator mobile device (Step 910). The conversation application is an application executing on a mobile device such as a cell phone that has a communication interface such as a Bluetooth interface. The conversation application provides a user interface that allows the user to initiate and secure private conversations with other users as described herein. A conversation application on a second mobile device allows a second user to see invitations to join a conversation from the first user and select to join the conversation.

The process 900 continues by connecting to a microphone unit embedded in a mask wearable by the initiator to connect with mobile devices of other users (joiners) (Step 920). The conversation application typically accesses the communication interface (Bluetooth interface) through existing application program interfaces (APIs) to connect to a mask microphone unit that has a compatible communication interface incorporated in the mask microphone unit. The mask microphone unit is preferably removably embedded in a mask to allow the user to move the mask microphone unit to a fresh mask as needed. The microphone unit may be deformable such that it forms a custom fit over the nose bridge of the user as described above.

The process 900 continues by initiating and securing a conversation with a new converser (Step 930). A new converser is another user, a second user, that the first user has not previously had a conversation with such that there has been no previous exchange between user mobile devices including capturing converser phone names and exchanging authentication keys. Additional details of initiating and securing a conversation with a new converser is described below with reference to FIG. 10. Initiate and secure a conversation with a previous converser (Step 940). A previous converser is a second user that the first user has previously had a conversation with such that there has been a previous conversation including capturing converser phone names and exchanging authentication keys. Additional details of initiating and securing a conversation with a previous converser is described below with reference to FIG. 11. Allow the user to configure microphone unit settings (Step 950). The conversation application allows the user to configure and store setting from the microphone unit over the communication link. Additional details of configuring the microphone unit are described below with reference to FIG. 12.

Figure 10:
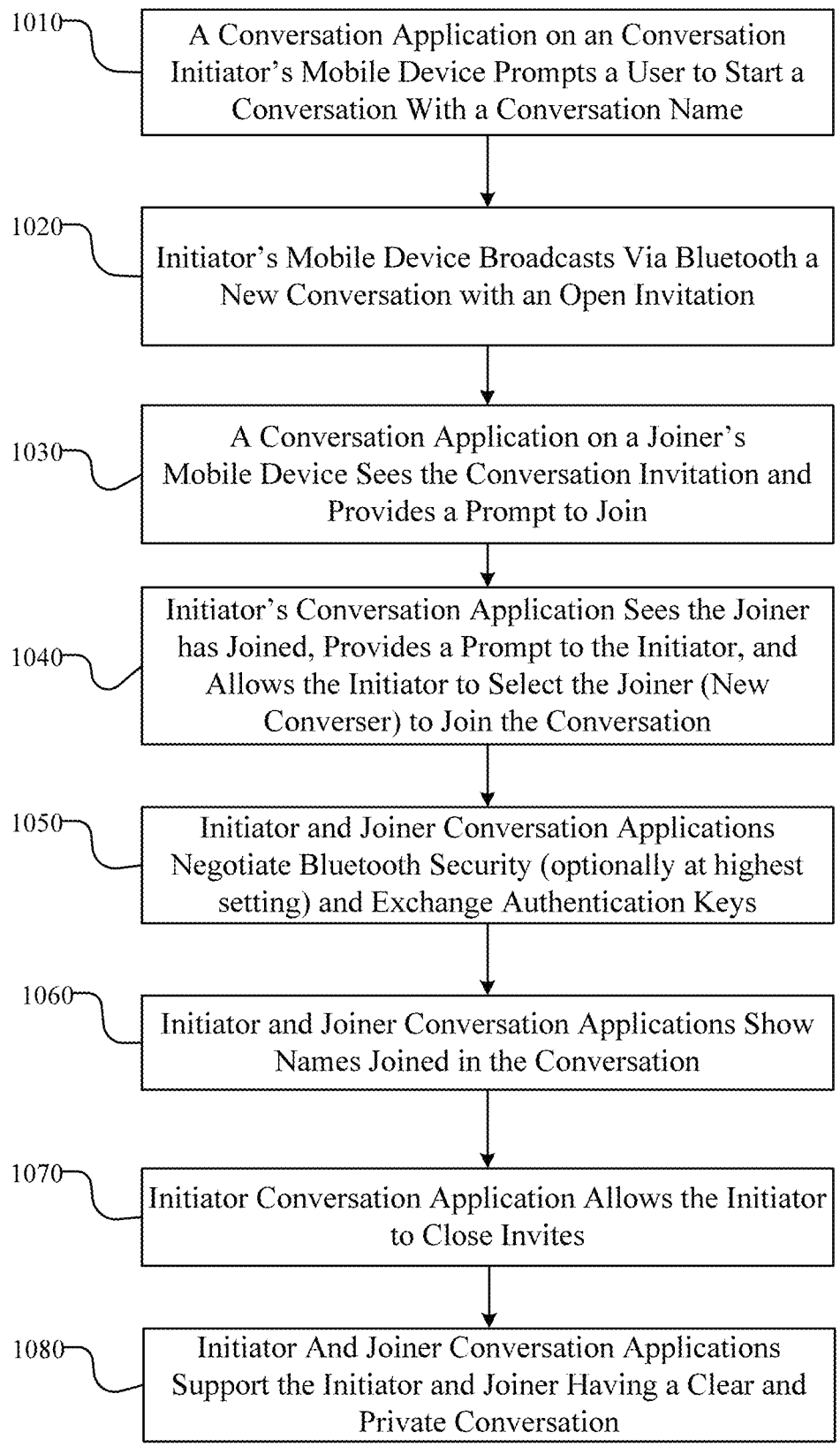
FIG. 10 is an example implementation of a method for a face mask communication system to initiate and secure a conversation with a new converser.

FIG. 10 is an example implementation of a method for a face mask communication system to initiate and secure a conversation with a new converser. The flowchart in FIG. 10 is one possible implementation for step 920 in FIG. 9. First, a conversation application on a conversation initiator's mobile device prompts a first user to start a conversation with a conversation name (Step 1010). The conversation name is a label for the conversation. For example, the conversation name may correspond to the name of the first user, second user or both. The initiator's mobile device broadcasts via a short-range communication network a new conversation with an open invitation (Step 1020). The short-range communication network may be a Bluetooth network or similar network as known or developed in the future. An open invitation may be viewed by all users within range of the initiator's (first user's) mobile device. A conversation application on a joiner's mobile device (new converser) sees the conversation invitation and provides a prompt for the joiner (second user) to join (Step 1030). The second user may have a mobile device similar to the first user's mobile device with the conversation application. The conversation application may display the prompt on the user's mobile device as shown in FIG. 6. After the second user selects the prompt to join the conversation, the second user's application may send a signal to the first mobile device that the second user has joined. The initiator's conversation application sees the joiner has joined, provides a prompt to the initiator, and allows the initiator to select the joiner (new converser) to join the conversation (Step 1040). The prompt to join the conversation can be as shown at step 4 in FIG. 6. Initiator and joiner conversation applications negotiate security and exchange authentication keys (Step 1050). The negotiated security and authentication keys may include Bluetooth security and may optionally be set at highest setting. Initiator and joiner conversation applications show names joined in the conversation (Step 1060). The names of those joined in the conversation may be shown as illustrated in step 6 of FIG. 6. Initiator conversation application allows the initiator to close invites (Step 1070). The initiator may close the invitations as shown in step 7 of FIG. 6. Initiator and joiner conversation applications support the initiator and joiner having a clear and private conversation (Step 1080). The conversation between the initiator and joiner (first and second users) may be accomplished over a short-range communication system such as Bluetooth with the system utilizing at least one mask microphone unit connected to the mobile device of the first user as described herein.

Figure 11:
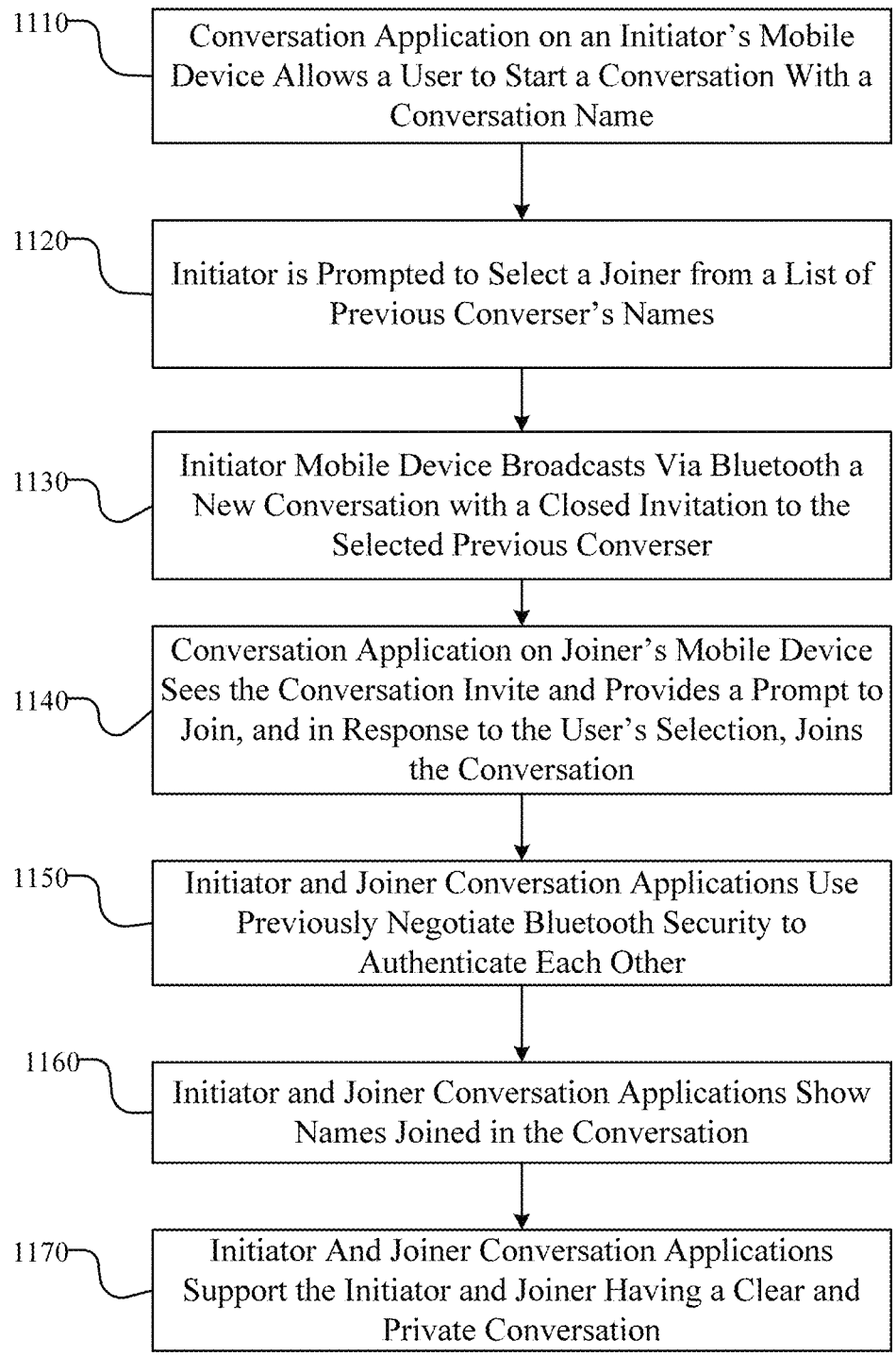
FIG. 11 is an example implementation of a method for a face mask communication system to initiate and secure a conversation with a previous converser.

FIG. 11 is an example implementation of a method for a face mask communication system to initiate and secure a conversation with a previous converser. The flowchart in FIG. 11 is one possible implementation for step 930 in FIG. 9. First, a conversation application on an initiator's mobile device allows a user to start a conversation with a conversation name (Step 1110). The conversation name is a label for the conversation as described above. Initiator is prompted to select a joiner from a list of previous converser's names (Step 1120). The names of previous conversers can be retrieved from the list of previous conversers in storage on the mobile device as described above with reference to FIG. 4. Initiator mobile device broadcasts via a short-range communication network, such as Bluetooth, a new conversation with a closed invitation to the selected previous converser (Step 1130). A closed invitation can only be seen by a user with the name selected from the list of previous conversers. A conversation application on a joiner's mobile device (previous converser) sees the conversation invitation and provides a prompt to join, and in response to the user's selection, joins the conversation (Step 1140). Since the closed invitation may be viewed only by the selected user, if the selected user is within range, the selected user's mobile device will display an available conversation as shown in step 3 of FIG. 7. Initiator and joiner conversation applications use previously negotiated authentication keys to authenticate each other (Step 1150). The negotiated security levels and authentication keys may include Bluetooth security and may optionally be set at highest setting. Initiator and joiner conversation applications show names joined in the conversation (Step 1160). The names of those joined in the conversation may be shown to the user as illustrated in FIG. 7. Initiator and joiner conversation applications support the initiator and joiner having a clear and private conversation (Step 1170). The conversation between the initiator and joiner may be accomplished over a short-range communication system as described above.

Figure 12:
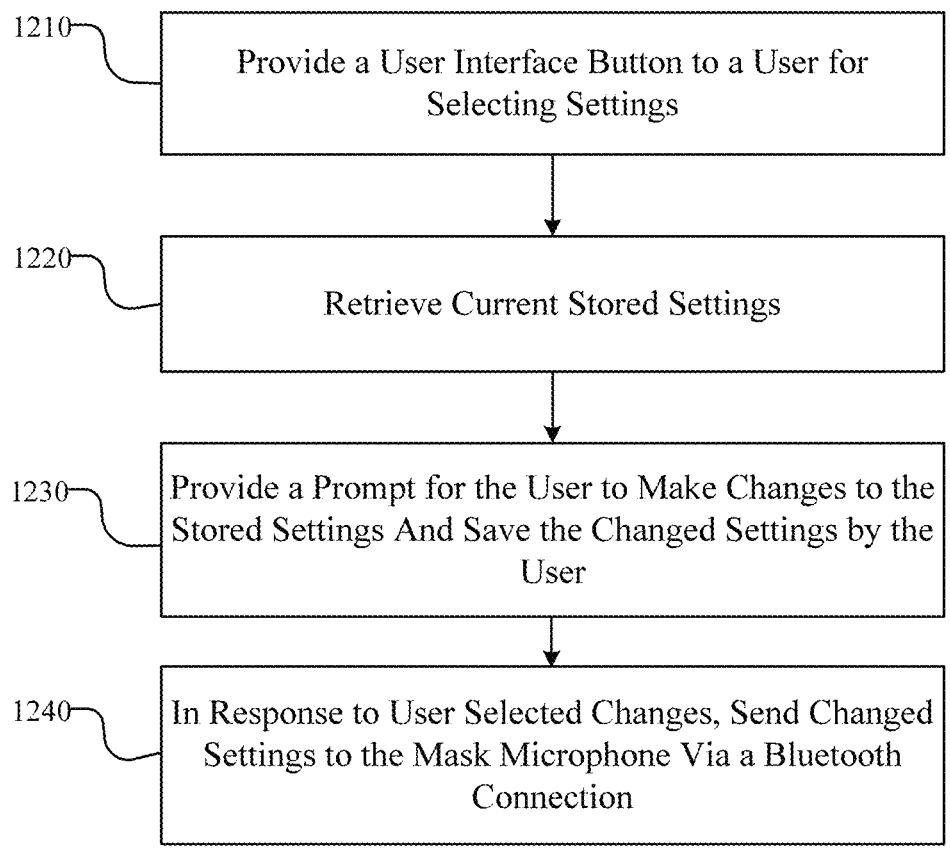
FIG. 12 is an example implementation of a method for a face mask communication system to allow the user to configure microphone settings.

FIG. 12 is an example implementation of a method for a face mask communication system to allow the user to configure microphone settings. The flowchart in FIG. 11 is one possible implementation for step 940 in FIG. 9. Provide a user interface button to a user for selecting settings (Step 1210). Retrieve current stored settings (Step 1220). The conversation application retrieves stored settings from storage of the conversation application and alternately, from the microphone unit over the communication link. The stored settings may include selecting a microphone sensitivity, Bluetooth security levels, and power management settings as described above. Provide a prompt for the user to make changes to the stored settings and save the changed settings selected by the user (Step 1230). The changed setting may be saved as application and microphone settings in the storage area of the conversation application as shown in FIG. 4. In response to user-selected changes, send changed settings to the mask microphone unit via a Bluetooth connection (Step 1240). The changed settings are sent to the mask microphone unit to affect the operation of the microphone unit. The changed settings are sent over the communication interface. The changed settings are stored in the hardware settings (450) of the mask microphone unit as shown in FIG. 4.

In the figures described above, e.g. FIG. 4, the mobile device 114 has hardware as shown which includes a processor 436 upon which various implementations of this disclosure may be implemented. The mobile device may include a bus or other communication mechanism (not shown) for communicating information, coupled to the processor 436 for processing information. The mobile device may also include storage 438 that may include memory such as a random-access memory (RAM) or other dynamic storage device, coupled to the bus for storing information and instructions to be executed by the processor 436. The storage 438 may also be used for storing temporary variables or other intermediate information during execution of instructions to be executed by the processor 436. The hardware storage 438 may further include a read only memory (ROM) or other static storage device coupled to the bus for storing static information and instructions for the processor 436. The processor 436 may be coupled via the bus to a screen 440, such as a liquid crystal display (LCD), for displaying information. One or more user input devices, such as a touch screen may be coupled to the bus, and may be configured for receiving various user inputs, such as user command selections and communicating these to the processor 436.

The mobile device 114 may include respective resources of the processor 436 executing, in an overlapping or interleaved manner, respective program instructions. Instructions may be read into the main storage 438 from another machine-readable medium. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media may include, for example, optical or magnetic disks. Transmission media may include optical paths, or electrical or acoustic signal propagation paths, and may include acoustic or light waves, such as those generated during radio-wave and infra-red data communications, that are capable of carrying instructions detectable by a physical mechanism for input to a machine.

The mobile device 114 may also include a communication interface (not shown) coupled to the bus, for two-way data communication coupling to a network link connected to a local network as known in the art. The network link may provide data communication through one or more networks to other data devices. For example, the network link may provide a connection through the local network to a host computer or to data equipment operated by an Internet Service Provider (ISP) for access to a server through the Internet, for example, to obtain code for an application program or an Internet web page.

As used herein, "computer-readable" medium" refers to a device, such as storage 438, able to temporarily or permanently store instructions and data that cause computer system or machine to operate in a specific fashion. The term "computer-readable medium," as used herein, does not encompass transitory electrical or electromagnetic signals per se (such as on a carrier wave propagating through a medium); the term "computer-readable medium" may therefore be considered tangible and non-transitory. Non-limiting examples of a non-transitory, tangible computer-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "computer-readable medium" applies to a single medium, or combination of multiple media, used to store instructions for execution by a computer system, such as mobile device 114, such that the instructions, when executed by one or more processors 436, cause the system to perform and one or more of the features described herein. Accordingly, a "computer-readable medium" may refer to a single storage device, as well as "cloud-based" storage systems or storage networks that include multiple storage apparatus or devices.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A method of communicating with a mobile device while wearing a face mask, comprising:
   providing a conversation application for execution on a first mobile device;
   connecting to a mask microphone unit embedded in a face mask wearable by a first user to allow the first user to connect and communicate with a second mobile device of a second user through the connected mask microphone unit;
   initiating and securing a conversation with the second user that allows the first user and second user to converse over a communication network; and
   configuring microphone unit settings;
   wherein the second user is a new converser and initiating and securing a conversation with the second user further comprises:
      prompting the second user on a second user's mobile device to start a conversation with a conversation name;
      broadcasting over a communications interface a new conversation with an open invitation;
      on a second user's mobile device, providing a prompt for the second user to join the new conversation;
      on the first mobile device, providing a prompt to the first user to select the second user to join a new conversation;
      negotiating security and exchanging authentication keys to authenticate the first user's and second user's mobile devices;
      showing names joined in the new conversation on the first user and second user's mobile devices; and
      supporting the first user and second user having a private conversation.

2. The method of communicating with the mobile device while wearing the face mask of claim 1, further comprising connecting to earphones wearable by the first user to allow the first user to hear the conversation.

3. A method of communicating with a mobile device while wearing a face mask, comprising:
   providing a conversation application for execution on a first mobile device;
   connecting to a mask microphone unit embedded in a face mask wearable by a first user to allow the first user to connect and communicate with a second mobile device of a second user through the connected mask microphone unit;
   initiating and securing a conversation with the second user that allows the first user and second user to converse over a communication network; and
   configuring microphone unit settings;
   wherein the second user is a previous converser and initiating and securing a conversation with the second user comprises:

prompting the first user on a first user's mobile device to start a conversation with a conversation name;
prompting the first user to select a name from a list of previous converser's names;
broadcasting via Bluetooth a new conversation with a closed invitation;
on a second user's mobile device, providing a prompt for the second user to join the new conversation, and in response to an indication the second user selected to join, joining the second user in the conversation;
using previously negotiated security keys to authenticate the first user's and second user's mobile devices;
showing names joined in the conversation on the first user's and second user's mobile devices; and
supporting the first user and second user having a private conversation.

4. A method of communicating with a mobile device while wearing a face mask, comprising:
providing a conversation application for execution on a first mobile device;
connecting to a mask microphone unit embedded in a face mask wearable by a first user to allow the first user to connect and communicate with a second mobile device of a second user through the connected mask microphone unit;
initiating and securing a conversation with the second user that allows the first user and second user to converse over a communication network; and
configuring microphone unit settings;
wherein configuring microphone unit settings comprises:
providing a user interface button for selecting settings;
retrieving current stored settings;
providing a prompt to make changes to the stored settings, in response to an indication the first user made changes to the settings, saving changes made by the first user; and
in response to an indication the first user made changes to the settings, sending the changed settings to the mask microphone unit via a Bluetooth connection.

5. A face mask communication system comprising:
a mask microphone unit removably insertable into a face mask, the mask microphone unit comprising;
a microphone;
a deformable housing allowing the mask microphone unit to form a custom fit over a user's nose bridge;
a receiver/transmitter in the housing with a communication interface connected to the microphone;
a battery receptacle in the housing for a battery providing power to the receiver; and
a conversation application comprising executable instructions that, when executed by a processor, cause the processor to control a mobile device to:
connect the conversation application to the mask microphone unit embedded in a mask wearable by a first user to allow the first user to converse with a second user; and
initiate and secure a conversation with the second user;
wherein the second user is a new converser and initiating and securing a conversation with the second user further comprises:
prompting the first user on first user's mobile device to start a conversation with a conversation name;
broadcasting via Bluetooth a new conversation with an open invitation;
on a second user's mobile device, providing a prompt for the second user to join the new conversation;

on the first user's mobile device, providing a prompt to the first user to select the second user to join the new conversation;
showing names joined in the conversation on the first user and second user's mobile devices; and
supporting the first user and second user having a private conversation.

6. The face mask communication system of claim 5, wherein the deformable housing of the microphone unit comprises a plurality of interconnecting segments.

7. The face mask communication system of claim 5, wherein the deformable housing of the microphone unit comprises a deformable material.

8. The face mask communication system of claim 5, further comprising a connector module attached to the housing providing a connection for charging the battery.

9. The face mask communication system of claim 5, wherein a conversation application further connects the conversation application to earphones wearable by the first user to allow the first user to hear the conversation.

10. The face mask communication system of claim 5, further comprising negotiating Bluetooth security and exchanging authentication keys to authenticate the first and second user's mobile devices.

11. A face mask communication system comprising:
a mask microphone unit removably insertable into a face mask, the mask microphone unit comprising;
a microphone;
a deformable housing allowing the mask microphone unit to form a custom fit over a user's nose bridge;
a receiver/transmitter in the housing with a communication interface connected to the microphone;
a battery receptacle in the housing for a battery providing power to the receiver; and
a conversation application comprising executable instructions that, when executed by a processor, cause the processor to control a mobile device to:
connect the conversation application to the mask microphone unit embedded in a mask wearable by a first user to allow the first user to converse with a second user;
initiate and secure a conversation with the second user;
wherein the second user is a previous converser and initiating and securing a conversation with the second user comprises:
prompting the second user on a second user's mobile device to start a conversation with a conversation name;
prompting the second user to select a name from a list of previous converser's names;
broadcasting via Bluetooth a new conversation with a closed invitation;
on a second user's mobile device, providing a prompt for the second user to join the new conversation, and in response to an indication the second user selected to join, joining the second user in the conversation;
using previously negotiated authentication keys to authenticate the first user and second user's mobile devices;
showing names joined in the conversation on the first user and second user's mobile devices; and
supporting the first user and second user having a private conversation.

12. A face mask communication system comprising:
a mask microphone unit removably insertable into a face mask, the mask microphone unit comprising;
a microphone;

a deformable housing allowing the mask microphone unit to form a custom fit over a user's nose bridge;

a receiver/transmitter in the housing with a communication interface connected to the microphone;

a battery receptacle in the housing for a battery providing power to the receiver; and a conversation application comprising executable instructions that, when executed by a processor, cause the processor to control a mobile device to:

connect the conversation application to the mask microphone unit embedded in a mask wearable by a first user to allow the first user to converse with a second user;

initiate and secure a conversation with the second user; and configure microphone unit settings, wherein configuring microphone unit settings comprises:

providing a user interface button for selecting settings;

retrieving current stored setting for the microphone unit;

providing a prompt to make changes to the stored settings, in response to an indication the first user made changes to the settings, saving changes made by the first user; and in response to an indication the first user made changes to the settings, sending the changed settings to the mask microphone unit via a Bluetooth connection.

\* \* \* \* \*